(12) United States Patent
Gruen et al.

(10) Patent No.: US 11,514,649 B2
(45) Date of Patent: Nov. 29, 2022

(54) CAMERA FOR AUGMENTED REALITY DISPLAY

(71) Applicant: Microsoft Technology Licensing, LLC, Redmond, WA (US)

(72) Inventors: Robert Warren Gruen, Seattle, WA (US); Weige Chen, Redmond, WA (US); Michael George Boulton, Seattle, WA (US); Roberta Rene Moeur, North Bend, WA (US); Bernard Charles Kress, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 16/888,489

(22) Filed: May 29, 2020

(65) Prior Publication Data
US 2021/0375050 A1    Dec. 2, 2021

(51) Int. Cl.
*G06T 19/00* (2011.01)
*G02F 1/137* (2006.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC . G06T 19/006; G06T 2200/24; G02B 27/017; G02B 27/0172; G02B 2027/0138;
(Continued)

(56) References Cited

U.S. PATENT DOCUMENTS

| 6,614,408 B1 | 9/2003 | Mann |
| 9,229,233 B2 | 1/2016 | Osterhout et al. |

(Continued)

FOREIGN PATENT DOCUMENTS

WO    2014145064 A1    9/2014

OTHER PUBLICATIONS

Yang, J. (2018). Study and optimization of an optical see-through near to eye display system for augmented reality (Doctoral dissertation, Université de Strasbourg) (pp. 1-141).*

(Continued)

*Primary Examiner* — Sarah Lhymn
(74) *Attorney, Agent, or Firm* — Alleman Hall Creasman & Tuttle LLP

(57) ABSTRACT

An augmented reality display device includes a near-eye display configured to present imagery to a user eye. A camera is configured to capture light from a real-world environment and produce output useable to contribute to the imagery presented to the user eye via the near-eye display. The camera includes an aperture configured to receive the light from the real-world environment and an image sensor configured to respond to the light received from the real-world environment by generating sensor output signals useable to produce images on the near-eye display depicting the real-world environment. One or more optical elements provide an optical path for light from the aperture to the image sensor, the optical path having a length that is within a threshold of a distance between the user eye and the aperture of the camera.

18 Claims, 5 Drawing Sheets

(51) Int. Cl.
*G06F 3/01* (2006.01)
*H04N 5/225* (2006.01)
*G02B 27/01* (2006.01)
*G03B 9/02* (2021.01)

(52) U.S. Cl.
CPC ............... *G02F 1/137* (2013.01); *G03B 9/02* (2013.01); *G06F 3/011* (2013.01); *H04N 5/2253* (2013.01); *H04N 5/2254* (2013.01); *G02B 2027/0138* (2013.01); *G02B 2027/0178* (2013.01); *G06T 2200/24* (2013.01)

(58) Field of Classification Search
CPC ............ G02B 2027/0178; G02B 5/005; G02B 2027/013; G02B 2027/4272; G02F 1/137; G03B 9/02; G06F 3/011
See application file for complete search history.

(56) References Cited

U.S. PATENT DOCUMENTS

| | | | | |
|---|---|---|---|---|
| 2012/0212414 | A1 | 8/2012 | Osterhout et al. | |
| 2015/0234205 | A1 | 8/2015 | Schowengerdt | |
| 2016/0309065 | A1* | 10/2016 | Karafin | H04N 5/232 |
| 2017/0068100 | A1* | 3/2017 | Ouderkirk | G02B 5/30 |
| 2017/0244948 | A1* | 8/2017 | Pang | H04N 5/22541 |
| 2018/0089903 | A1* | 3/2018 | Pang | H04N 13/161 |
| 2018/0203232 | A1* | 7/2018 | Bouchier | G02B 5/1828 |
| 2020/0159030 | A1* | 5/2020 | Ayres | G03H 1/0248 |
| 2020/0183152 | A1* | 6/2020 | Pennell | G02B 27/141 |
| 2020/0264435 | A1* | 8/2020 | Urness | G02B 5/1823 |
| 2021/0088796 | A1* | 3/2021 | Ayres | G03H 1/0248 |
| 2021/0103072 | A1* | 4/2021 | Nikolov | G02B 1/002 |
| 2022/0121292 | A1* | 4/2022 | Lin | G06V 40/28 |

OTHER PUBLICATIONS

Yao, C., Cheng, D., Yang, T., & Wang, Y. (2018). Design of an optical see-through light-field near-eye display using a discrete lenslet array. Optics Express, 26(14), 18292-18301.*

Xiao, J., Liu, J., Lv, Z., Shi, X., & Han, J. (2019). On-axis near-eye display system based on directional scattering holographic waveguide and curved goggle. Optics express, 27(2), 1683-1692.*

"Combating VR Sickness: Debunking Myths and Learning What Really Works", Retrieved from: https://vr.arvilab.com/blog/combating-vr-sickness-debunking-myths-and-learning-what-really-works, Mar. 22, 2018, 8 Pages.

"Virtual Reality/Augmented Reality White Paper", In White Paper of CAICT, Dec. 2017, 38 Pages.

Abrash, Michael., "Why You Won't See Hard AR Anytime Soon", Retrieved from: http://blogs.valvesoftware.com/abrash/why-you-wont-see-hard-ar-anytime-soon/, Jul. 20, 2012, 20 Pages.

Anthes, Gary., "Augmented Reality Gets Real", In Journal of Communications of the ACM, vol. 62, Issue 9, Sep. 2019, pp. 16-18.

Beeler, et al., "ASW and Passthrough+ with NVIDIA Optical Flow", Retrieved from: https://developer.oculus.com/blog/asw-and-passthrough-with-nvidia-optical-flow/, May 23, 2019, 3 Pages.

Coldewey, Devin., "Making VR Less Painful for the Vision-impaired", Retrieved from: https://techcrunch.com/2017/02/13/making-vr-less-painful-for-the-vision-impaired/, Feb. 14, 2017, 3 Pages.

Fernandes, et al., "Combating VR Sickness through Subtle Dynamic Field-Of-View Modification", In Proceedings of IEEE Symposium on 3D User Interfaces, Mar. 19, 2016, pp. 201-210.

"International Search Report and Written Opinion Issued in PCT Application No. PCT/US2021/025288", dated Jul. 6, 2021, 10 Pages.

* cited by examiner

CAMERA FOR AUGMENTED REALITY DISPLAY

BACKGROUND

"Augmented reality" systems typically present virtual images to a user while the user maintains at least some visibility of their surrounding environment. In this manner, computer-generated objects, characters, or other imagery may appear to the user as if they are integrated into the user's real-world environment.

Some augmented reality devices present virtual images via a partially or fully transparent display of a head-mounted display device (HMD), allowing the user to directly view their surrounding environment while the virtual images are presented. Other augmented reality devices incorporate fully opaque displays, which are used to provide computer-generated images in conjunction with images of the real-world captured by a camera. These are sometimes referred to as "video-passthrough" augmented reality devices.

DETAILED DESCRIPTION

Figure 1:
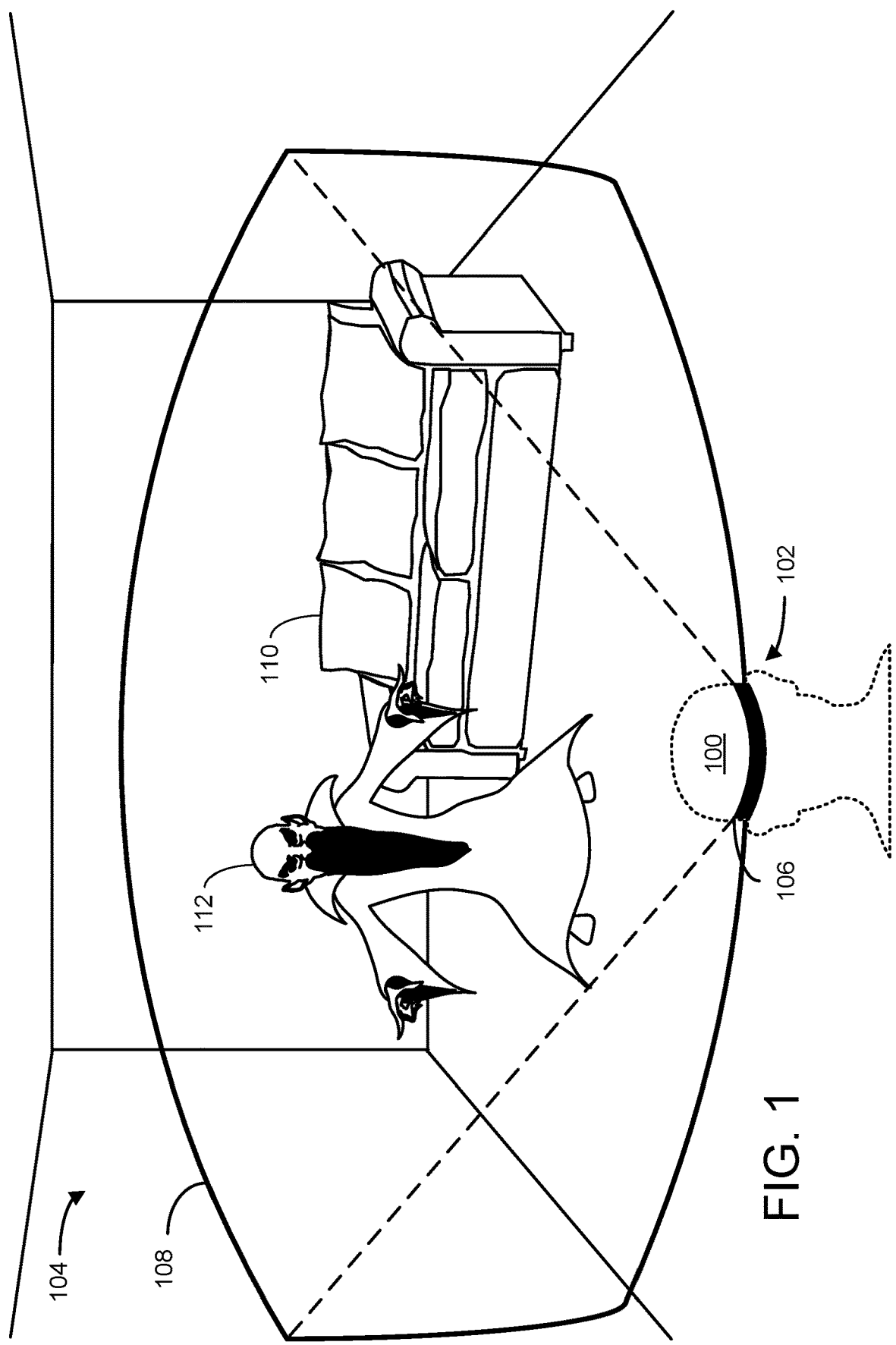
FIG. 1 schematically illustrates use of an augmented reality display device to view virtual imagery.

In augmented reality scenarios, a common goal is to achieve near-seamless integration between virtual imagery and real-world surroundings. In other words, it is desirable for virtual objects to "blend-in" with their surroundings as much as is reasonably possible. For example, it is not desirable for virtual objects to appear to move in unnatural ways—e.g., "swimming" or "jittering." It is similarly not desirable for an augmented reality device to interfere with a user's view of the real-world in distracting or disorienting ways, even in the absence of any virtual imagery. Thus, in an ideal scenario, virtual objects should be rendered and displayed for substantially the same perspective from which the user views their real-world surroundings, and both of these perspectives should ideally correspond to what the user's brain expects—i.e., the normal perspective of the user's eyes.

When these considerations are not met, augmented reality devices of all types have a propensity to cause motion sickness in some users. Motion sickness often occurs in situations in which the visual feedback received by the human brain differs from the brain's perceived or expected motion. In the specific case of video-passthrough augmented reality devices, the camera(s) used to capture video of the real-world environment for display to the user via the augmented reality display device will inherently have a different perspective than the user's eye would, if the user was viewing the real-world without the device. This can cause the real-world to appear slightly magnified, and at a different perspective, as the camera is often spaced in front of the user's eyes. This can also cause movements of the user's head to seem amplified—e.g., during nodding or head-turning motions. Furthermore, when virtual imagery is superimposed over the video of the real-world, the virtual imagery can appear to swim or jitter during head movements, as virtual imagery is typically rendered for a virtual pose that also differs from the perspective of the camera. Each of these factors alone and in combination can cause motion sickness in susceptible users.

Accordingly, the present disclosure is directed to a camera for use with augmented reality display devices—e.g., those used to provide video-passthrough augmented reality experiences. Specifically, the camera described herein includes an aperture configured to receive light from a real-world environment, and an image sensor configured to respond to the light by generating output signals useable to produce images depicting the real-world environment on a near-eye display of an augmented reality display device. The light from the real-world environment follows an optical path from the aperture to the image sensor that is defined by one or more optical elements within the camera.

As one example, the optical elements may include two or more structures configured to repeatedly reflect the light within the camera before it reaches the image sensor. In this manner, the optical path taken by the light from the aperture to the image sensor may be longer than the physical length of the camera. To mitigate motion sickness, the camera may be constructed such that the length of the optical path taken by the light is similar to (e.g., within a suitable threshold of) the distance between the user's eye and the aperture of the camera. Thus, images captured by the camera may appear to have been captured from a perspective that is more consistent with the position of the user's eye, similar to a scenario in which the image sensor was disposed on or near the user's eye. This in turn can mitigate or alleviate symptoms of motion sickness in users of video-passthrough augmented reality devices.

It will be understood that, while the camera described herein is primarily described in the context of video-passthrough augmented reality, this is not limiting. Rather, a camera that uses one or more optical elements to alter the optical path of light from an aperture to an image sensor as described herein may be used in any suitable applications. As non-limiting examples, the camera described herein may be used for capturing video, still images (i.e., photography), or sensing, and may be used in conjunction with any virtual or augmented reality devices and/or any other suitable computing devices. In some examples, the camera described herein may be implemented as input subsystem 708 described below with respect to FIG. 7.

FIG. 1 schematically depicts an example augmented reality scenario. Specifically, FIG. 1 schematically shows a user 100 using an augmented reality display device 102 in a real-world environment 104. Via a near-eye display 106 of the augmented reality display device, user 100 has a field-of-view 108, corresponding to the portion of the user's view that is occluded by the near-eye display. The present disclosure primarily contemplates a scenario in which the near-eye display is opaque. However, it will be understood that the approaches described herein may also be applied to augmented reality display devices having partially or fully transparent near-eye displays. In some cases, a transparency of the near-eye display may be dynamically adjustable.

Augmented reality display device 102 provides an augmented reality experience by presenting images to the user's eyes via near-eye display 106. The images presented by the near-eye display include a mix of images depicting the real-world captured by a camera, as well as virtual images generated by or viewed with the augmented reality display device. In the example of FIG. 1, the user can see a real couch 110 imaged by the camera of the augmented reality display device, as well as a virtual character 112 generated by the augmented reality display device and presented on the near-eye display as part of an augmented reality experience.

Additionally, or alternatively, virtual images may be generated by a different device from the augmented reality display device. For example, the augmented reality display device may receive pre-rendered virtual images from a separate rendering computer and display the pre-rendered virtual images via the near-eye display. The rendering computer may be local to the augmented reality display device—e.g., communicating over a wired connection or suitable wireless protocol—or the rendering computer may be remote from the augmented reality display device (e.g., a server computer), communicating over the Internet or other suitable network.

Figure 2:
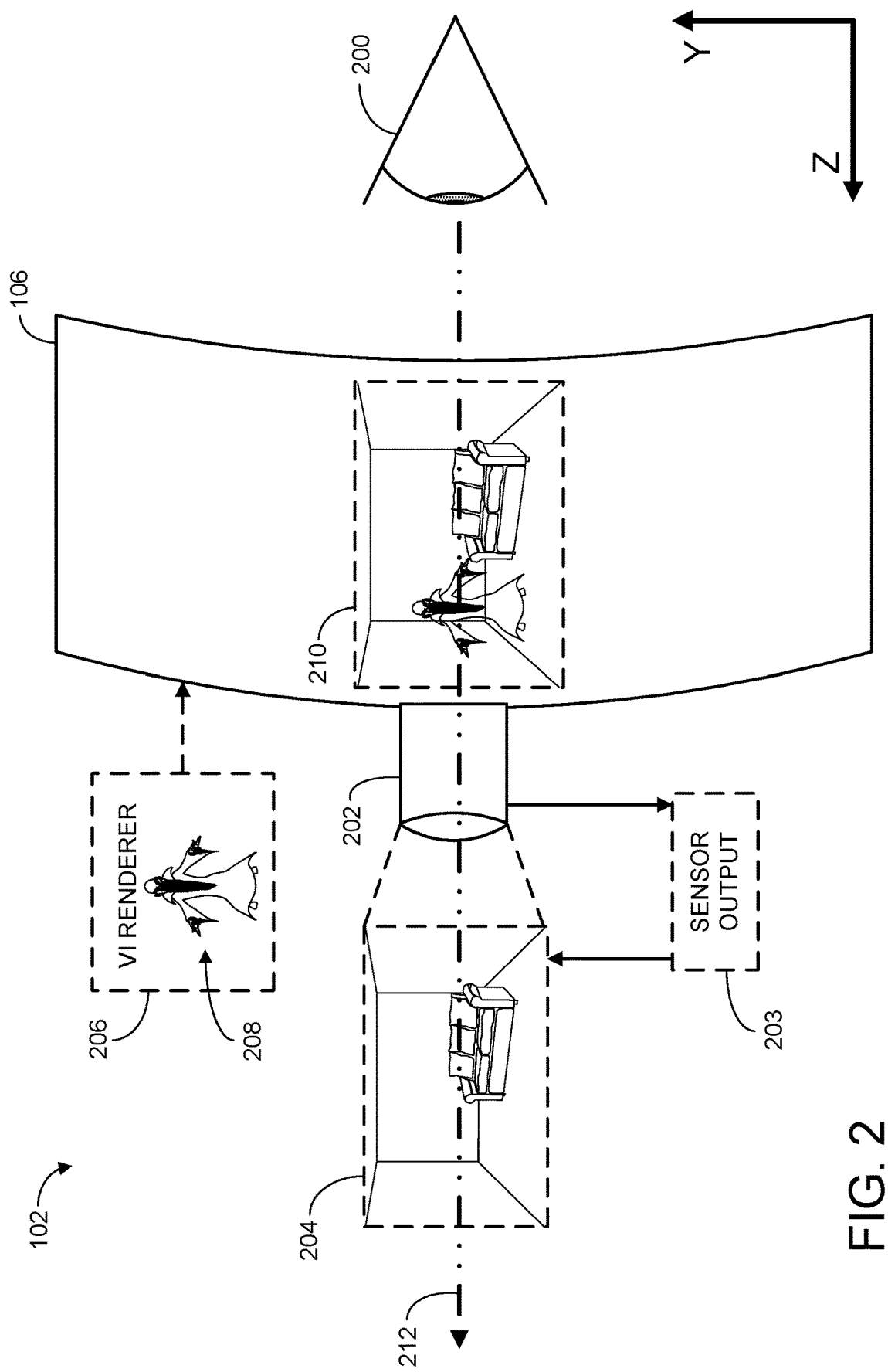
FIG. 2 schematically illustrates combining of images depicting a real-world environment with virtual images.

Mixing of real and virtual imagery is described in more detail with respect to FIG. 2. Specifically, FIG. 2 schematically shows aspects of augmented reality display device 102 during use. Near eye display 106 is positioned near a user eye 200 of user 100, such that images presented on the near-eye display are visible to the user. Augmented reality display device 102 is equipped with a camera 202 configured to capture light from the real-world environment and generate output useable to contribute to imagery presented to the user eye via the near-eye display. Specifically, as shown, camera 202 captures an image 204 of the real-world environment 104 depicted in FIG. 1 based on sensor output signals 203. The sensor output signals may take any suitable form—e.g., color values for each of a plurality of pixels as measured by an image sensor of the camera. Notably, image 204 may be a still image, or may be one frame of a video stream having any suitable framerate (e.g., 90 frames-per-second).

The light received by the camera from the real-world environment will typically be visible light, resulting in a visible-light image of the real-world environment similar to what would be seen by the user eye without the augmented reality display device. In other examples, however, the camera may generate images of the real-world environment based on other spectra of light, such as infrared, ultraviolet, X-ray, etc. Because these spectra of light are not visible to human eyes, the camera and/or augmented reality display device may convert pixel values corresponding to the received light into suitable visible RGB values. Furthermore, in FIG. 2, camera 202 is positioned along an optical axis 212 extending away from user eye 200. In this manner, the position of the camera may be substantially similar to the position of the user eye relative to an X axis (extending into the page) and a Y axis (extending vertically), only differing according to a Z axis (extending horizontally). In other examples, however, the camera need not lie along the optical axis extending away from the eye, but rather may have any suitable position relative to the X, Y, and Z axes. More details regarding camera 202 will be provided below with respect to FIGS. 3-6.

Augmented reality display device 102 also includes a virtual image renderer 206 configured to generate virtual images for display to the user eye via the near-eye display. As shown, the virtual image renderer has generated a virtual image 208 depicting a fictional wizard character. The virtual image 208 may then be superimposed over the real-world image 204 to generate an augmented reality image 210, which is presented on the near-eye display for viewing by the user eye. In this manner, the user may perceive the fictional wizard character as if it were physically present in the user's real-world environment.

Virtual imagery may be generated in any suitable way and for any suitable purpose. Virtual images may include any suitable image content, including virtual objects, characters, interface elements, heads-up-display (HUD) content, lighting effects, text, highlighting/shading, etc. For the sake of simplicity, all virtual image content included in a virtual image will be referred to as "virtual objects."

Typically, a virtual image will include one or more virtual objects that are rendered such that they appear to have a three-dimensional position or "pose" with respect to a surrounding real or virtual environment. In some examples, the pose may be a six degree-of-freedom (6DOF) pose, although fewer than six degrees-of-freedom may be used. Virtual objects may be "world-locked," such that they appear to maintain their positions relative to the surrounding environment even as the user's perspective changes. Additionally, or alternatively, virtual objects may be "body-locked," such that they appear to maintain a fixed position relative to the user as the user's perspective changes. Body-locked and/or world-locked virtual objects may additionally move along their own paths that are defined relative to either the user or the world—e.g., a body-locked virtual object may constantly appear to circle a user's head regardless of the user's position, and a world-locked virtual object may continuously float around a real-world room regardless of the user's position.

In any case, virtual images will be rendered relative to a virtual camera pose, corresponding to the approximate viewpoint of the user. For example, virtual images may be rendered relative to the approximate center of the augmented reality display device, as that may roughly correspond to the positions of the user's eyes while the augmented reality display device is worn. As the pose of the augmented reality display device changes—e.g., due to user movements—rendering of virtual images may be updated to maintain the body-locked or world-locked orientations of the virtual objects. The pose of the augmented reality display device may be tracked in any suitable way. In some examples, the augmented reality display device may include one or more tracking cameras (not shown) configured to track the pose of the augmented reality display device by imaging the real-world environment. Additionally, or alternatively, the augmented reality display device may include an inertial measurement unit (IMU) equipped with one or more suitable motion sensors configured to measure changes in the augmented reality display device's pose. Such motion sensors can include, as examples, gyroscopes, accelerometers, and magnetometers.

Virtual images may be updated with any suitable frame rate. In some examples, the frame rate at which virtual images are presented may match the frame rate at which images of the real-world environment are captured—e.g., 90 frames-per-second—although other frame rates may alternatively be used. Virtual images may be rendered by any suitable processing or logic componentry of the augmented reality display device. In other words, virtual image renderer 206 may be implemented as any suitable computer processor, or other component suitable for generating virtual images. In some examples, virtual image renderer 206 may be implemented as logic subsystem 702 described below with respect to FIG. 7. Furthermore, augmented reality display device 102 may additionally or alternatively include other computer components not depicted in FIG. 2 and not explicitly described herein, configured to provide other computer functions of the augmented reality display device. In some examples, augmented reality display device 102 may be implemented as computing system 700 described below with respect to FIG. 7.

As discussed above, camera 202 captures an image 204 of the real-world environment, which is combined with virtual image 208 to give augmented reality image 210. Augmented reality image 210 is presented to user eye 200 via near-eye display 106, substantially replacing at least a portion of the user's view of their surrounding environment. However, as shown, the position of the camera is different from the position of the user eye, meaning the real-world is imaged from a different perspective than the user's brain would ordinarily expect. As discussed above, this can cause a variety of issues that can contribute to motion sickness, such as magnification of the real-world, amplification of head motions, swimming or jittering of virtual imagery, etc.

This can be mitigated or alleviated when the optical path taken by the light from the aperture of the camera to the image sensor within the camera is modified to have a length that is within a suitable threshold of the distance between the user's eye and the camera's aperture. This has a similar effect to physically positioning the image sensor closer to the actual position of the user's eye.

Figure 3B:
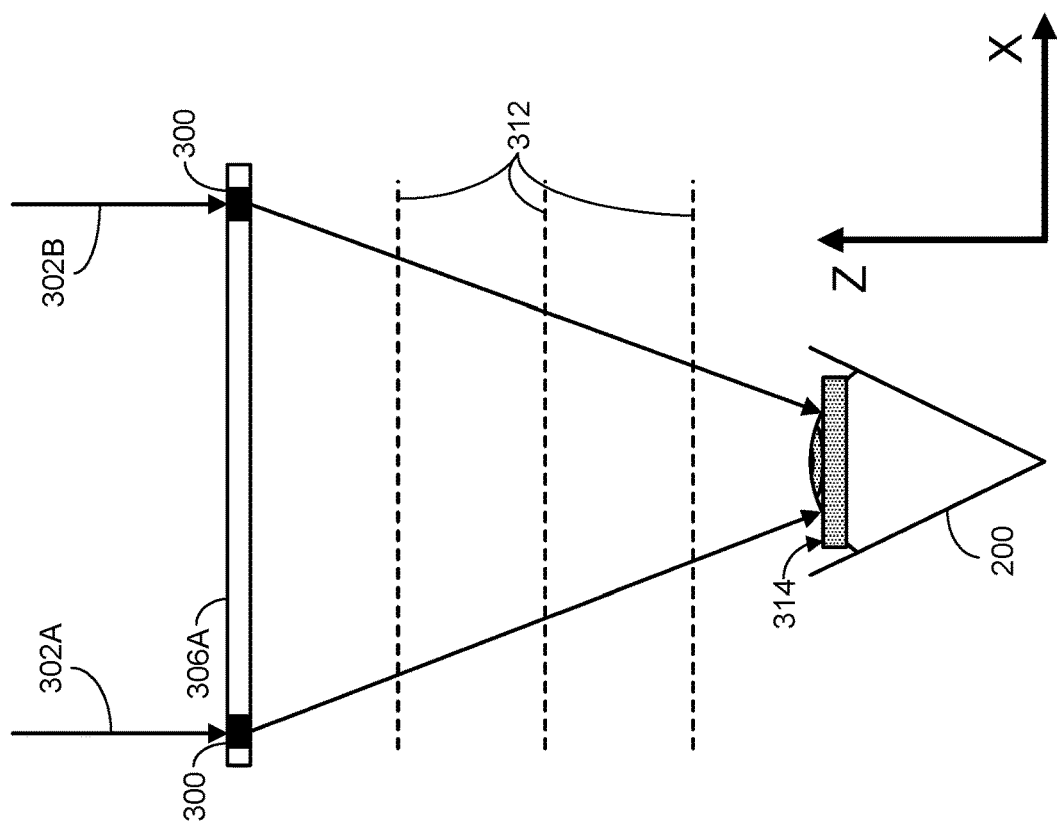
FIGS. 3A and 3B schematically depict an example camera for use with an augmented reality display device.
Figure 3A:
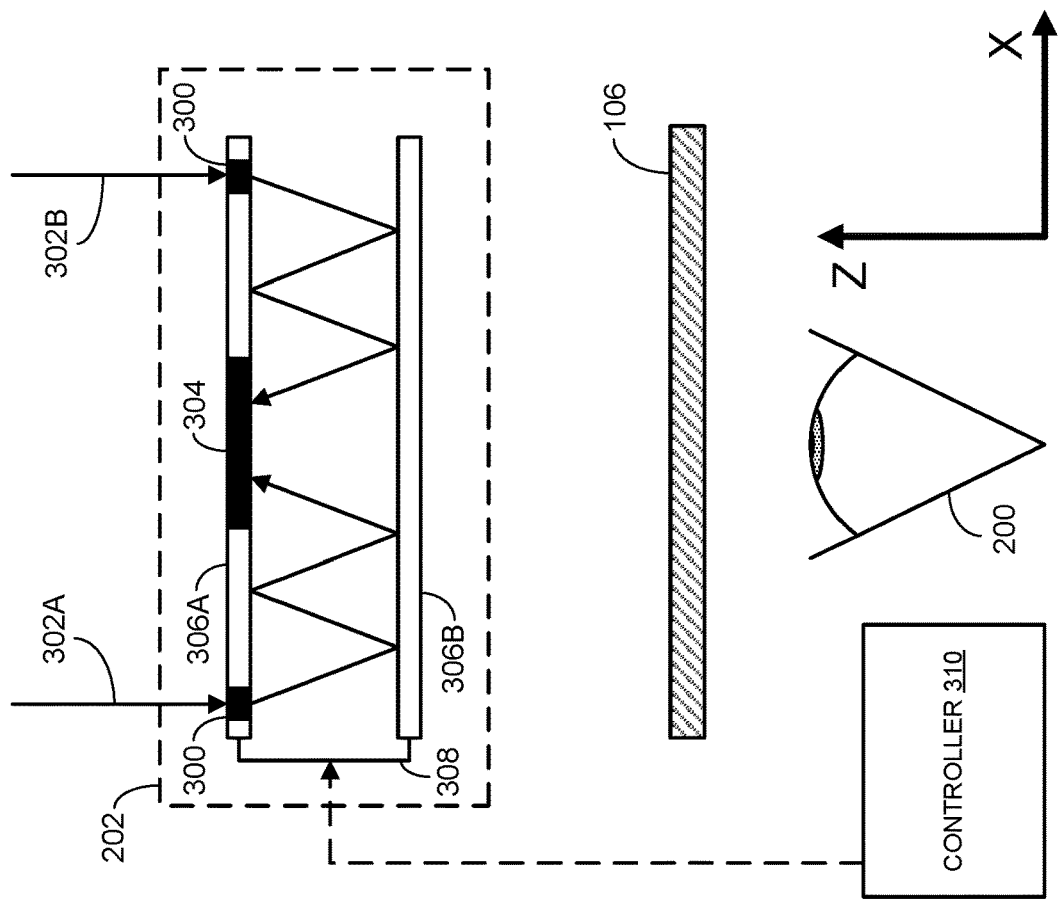

Accordingly, FIGS. 3A and 3B schematically depict details of optical elements disposed within camera 202 that may serve to lengthen the optical path taken by light from the aperture to the image sensor. Specifically, FIG. 3A schematically depicts user eye 200, as well as near-eye display 106 and camera 202 of augmented reality display device 102, shown in cross-section. Camera 202 includes an aperture 300 configured to receive light rays 302A and 302B from a real-world environment. Camera 202 also includes an image sensor 304 configured to respond to the light received from the real-world environment by generating sensor output signals useable to produce images on the near-eye display depicting the real-world environment (e.g., image 204 shown in FIG. 2). Light rays 302A and 302B follow an optical path from the aperture to the image sensor provided by one or more optical elements of the camera, as will be described in more detail below.

The camera aperture may have any suitable shape and size. In this example, the aperture includes an annular ring formed in an environment-facing surface of the camera. This is shown in more detail in FIG. 6, which shows an environment-facing surface of camera 202. As shown, camera 202 includes a single annular aperture formed near an outside edge of the camera. Image sensor 304 is shown in dashed lines, illustrating the relative position of the image sensor as compared to the body and aperture of the camera. In other examples, however, the camera may include multiple apertures—e.g., multiple annular rings having different radii—and/or apertures having other suitable shapes.

Any suitable type of image sensor may be used. In one example, the image sensor may be a complementary metal-oxide-semiconductor (CMOS) sensor. As another example, the image sensor could be a charge-coupled device (CCD) sensor.

Returning to FIG. 3A, camera 202 includes two light-redirection surfaces 306A and 306B that provide the optical path taken by the light from the aperture to the image sensor. Specifically, light rays 302A and 302B are repeatedly reflected between the two light-redirection surfaces, thereby lengthening the optical path. It will be understood that the specific arrangement depicted in FIG. 3A is provided for the sake of example and is not limiting. For example, in FIG. 3A, the light is reflected by the aperture-distal light-redirection surface two times along the optical path, and reflected by the aperture-proximal light-redirection surface once. In other implementations, however, light may be reflected by each of the light-redirection surfaces any suitable number of times along the optical path. This may vary based on size constraints, material constraints, a desired length of the optical path, and/or other considerations.

Furthermore, in FIG. 3A, the image sensor is disposed on an aperture-proximal light-redirection surface of the two light-redirection surfaces. Once again, however, this is not limiting. In other examples, the image sensor may be disposed on the aperture-distal light-redirection surface, or have any other suitable position with respect to other components of camera 202.

As discussed above, symptoms of motion sickness may be mitigated or entirely alleviated when the optical path taken by light through the camera has a length that is within a suitable threshold of a distance between the user eye and the aperture of the camera. This is illustrated in FIGS. 3A and 3B. Notably, the repeated reflections of light between light-redirection surfaces 306A and 306B increases the length of the optical path to be greater than the physical length of the camera, and substantially equal to the distance between user eye 200 and aperture 300.

FIG. 3B shows an equivalent "unfolded" view of camera 202. Specifically, user eye 200, aperture 300, light rays 302A and 302B, and aperture-proximal light-redirection surface 306A are still shown, while other elements of camera 202 are omitted. In essence, FIG. 3B illustrates an alternate optical path taken by the light, in which the light travels the same distance through space but is not repeatedly reflected by the light-redirection surfaces. Reference lines 312 indicate the positions along the "unfolded" optical path at which the light is reflected in FIG. 3A. By following this alternate "unfolded" path, the light rays converge at the position of the user eye rather than the image sensor. This is equivalent to a scenario in which the image sensor is disposed on or near the user's eye, as indicated by box 314 showing the equivalent position of the image sensor. In other words, the configuration depicted in FIG. 3A allows the image sensor to image the real-world environment as if the image sensor was located at box 314 shown in FIG. 3B. Thus, the image sensor will have a similar perspective to the user eye, without requiring eye surgery or interfering with eye functions, as would be the case if the image sensor was actually located at box 314.

It will be understood that the length of the optical path taken by the light may have any suitable relationship to the distance between the user eye and camera aperture. It is generally desirable for the length of the optical path taken by the light to be as close as possible to the distance between the user eye and the camera. However, it is estimated that significant benefits may be achieved even if the length of the optical path is only 50% of the distance between the user eye and the camera aperture. Thus, in general, the length of the optical path will be within a suitable threshold of the distance between the user eye and camera aperture. As one example, the threshold may be equal to 50%. In other examples, the threshold employed may be 25% or 10%. Any suitable value may be used, and in some cases, the threshold may be based on the distance between the eyes and the objects being viewed. In some cases, the length of the optical path taken by the light may be dynamically-adjustable, as will be described in more detail below.

Figure 4:
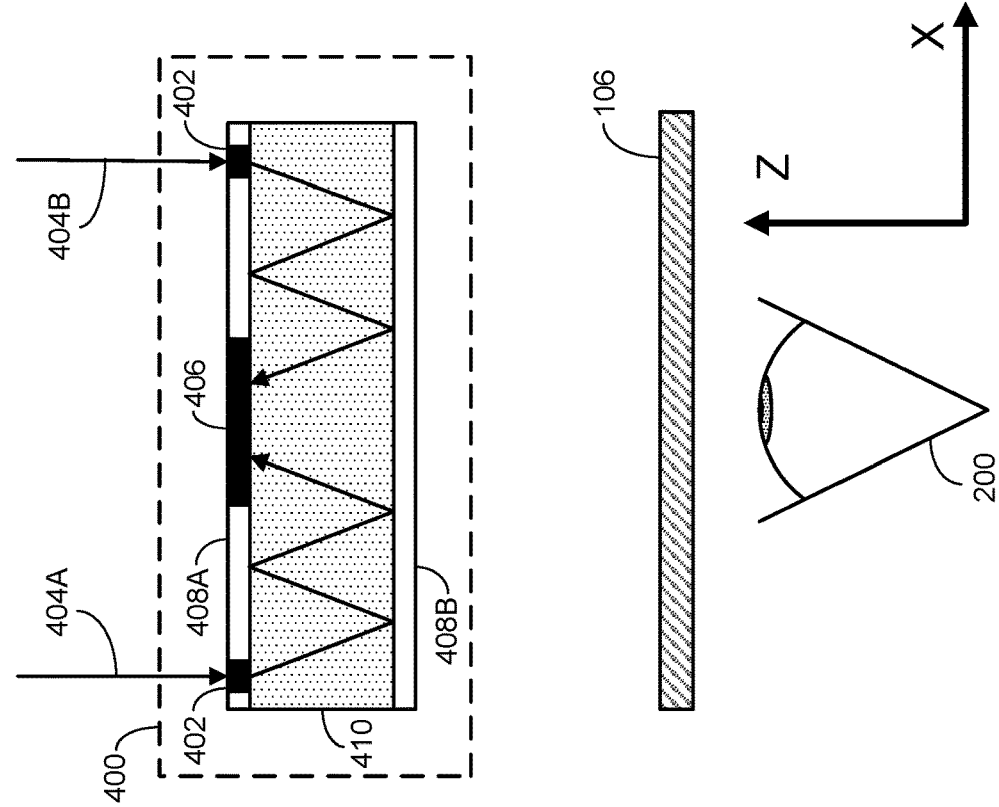
FIG. 4 schematically depicts another example camera for use with an augmented reality display device.

In the example of FIG. 3A, the two light-redirection surfaces are independent components separated by an airgap. In general, the two light-redirection surfaces may be separated by any suitable optically-transmissive medium. Alternatively, the two light-redirection surfaces may be first and second surfaces of a single structure. This is schematically illustrated in FIG. 4, which shows a different example camera 400 having an aperture 402, which receives light rays 404A and 404B. The light rays follow an optical path from the aperture to an image sensor 406, in which the light rays are repeatedly reflected by light-redirection surfaces 408A and 408B. Unlike FIG. 3A, in this example, the light-redirection surfaces are first and second surfaces of a single optically-transmissive substrate 410.

In cases where the two light-redirection surfaces are physically separate, as in FIG. 3A, the distance between the two light-redirection surfaces may be dynamically adjustable. In other words, either or both of the two light-redirection surfaces may be movable relative to the camera body to change the distance between the two surfaces. To this end, FIG. 3A includes a distance adjuster 308 between the two light-redirection surfaces operatively coupled to a controller 310. As one example, either or both of the light-redirection surfaces may be attached to a rail, and the distance adjuster may include a motor configured to move the light-redirection surface along the rail—e.g., relative to the Z axis. Controller 310 may include any suitable collection of computer hardware and firmware components, such that the controller may be activated by the augmented reality display device (and/or by the user) to dynamically adjust the distance between the light-redirection surfaces. By adjusting this difference, the length of the optical path taken by the light from the aperture to the image sensor may be changed. In some scenarios, adjusting this distance may benefit users whose eye sockets are different depths. This can be used to focus the light received from the real-world environment to a desired optical power—e.g., to enable autofocus and/or to fine-tune the real-world image presented to the user to mitigate symptoms of motion sickness.

Similar effects may be achieved when the two light-redirection surfaces are first and second surfaces of a single optically-transmissive substrate, as is the case in FIG. 4. For example, the optically-transmissive substrate may be an electro-optic material having a dynamically-changeable refractive index, such as a liquid crystal or other suitable material. Thus, as with FIG. 3A, camera 400 may be operatively coupled to a controller configured to affect the light transmissive properties of the optically-transmissive substrate by dynamically supplying an electrical voltage or current.

Figure 5:
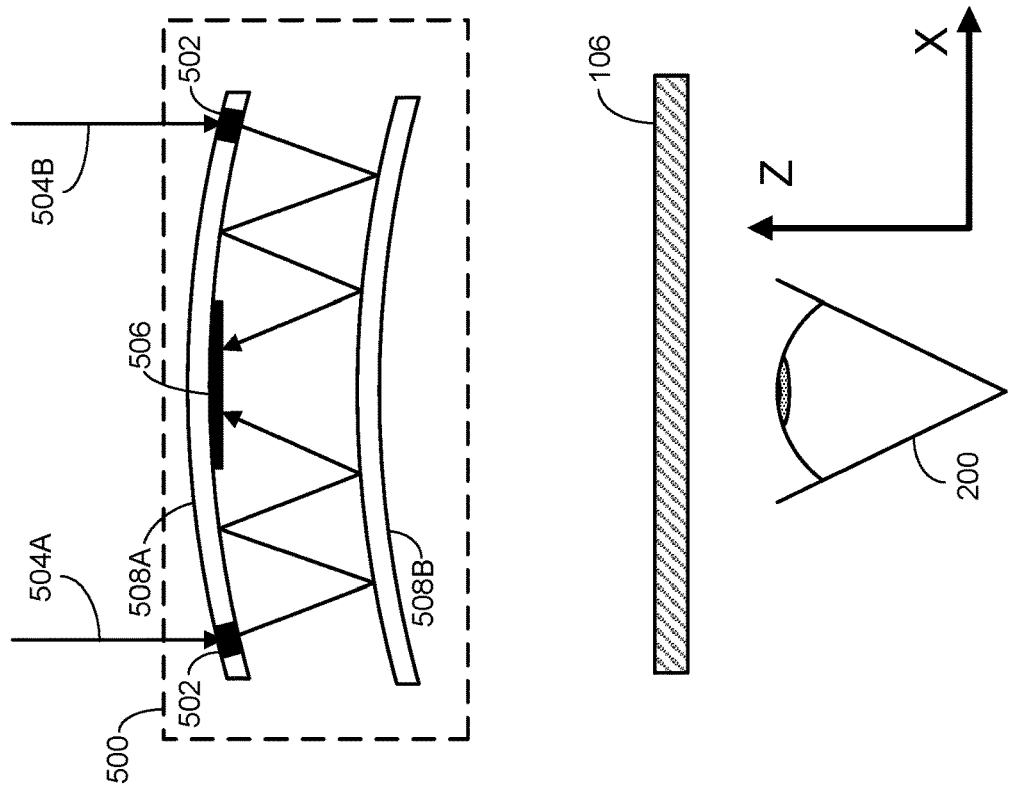
FIG. 5 schematically depicts another example camera for use with an augmented reality display device.

In the example of FIG. 3A, the depicted light-redirection surfaces are planar and parallel to one another. In other examples, however, this need not be the case. FIG. 5 depicts another example camera 500. As with cameras 202 and 400, camera 500 includes an aperture 502 configured to receive light rays 504A and 504B from a real-world environment. The light rays follow an optical path from the aperture to an image sensor 506, in which the light rays are repeatedly reflected by light-redirection surfaces 508A and 508B. Unlike the earlier-described cameras, the light-redirection surfaces in camera 500 are curved. Such curved light-redirection surfaces may have any suitable curvature radius, and the curves may be convex or concave depending on the implementation. Furthermore, each of the two light-redirection surfaces need not be curved in the same manner or to the same extent.

Light-redirection surfaces 508A and 508B are independent components separated by an airgap. Thus, as with camera 202, the distance between the curved light-redirection surfaces may in some cases be dynamically-adjustable via any suitable mechanism. Alternatively, as with camera 400, curved light-redirection surfaces may be separate surfaces of a single optically-transmissive substrate. In such cases, the optically-transmissive substrate may in some cases be an electro-optic material having a dynamically-adjustable refractive index.

Light-redirection surfaces, as well as other components of the cameras described herein, may be produced via any suitable fabrication methods. As one example, when planar light-redirection surfaces are used, such surfaces may be produced via wafer-scale fabrication. Thus, the light-redirection surfaces may be wafers of silicon, or another suitable material, with one or more optical elements or coatings applied to the wafer. Alternatively, the light-redirection surfaces may be subdivisions of a single wafer. When the light-redirection surfaces are curved, another suitable fabrication method may be used, such as diamond turning.

In general, light-redirection surfaces, as well as other optical components of the cameras described herein, may be composed of any suitable materials. As examples, light-redirection surfaces may be composed of silicon, plastic, metal, glass, ceramics, or other suitable materials. When the light-redirection surfaces are separate surfaces of an optically-transmissive substrate, the substrate may be constructed from any suitably-transmissive materials—e.g., glass, transparent plastic, transparent silicon, or electro-optic materials. In various cases, substantially the entire surface area of each light-redirection surface may be reflective, or only individual portions of the light-redirection surfaces may be reflective. In other words, individual portions of each light-redirection surface may have reflective coatings printed on, or otherwise applied to, the surface.

Furthermore, optical elements disposed within the cameras described by this disclosure need not be limited to the light-redirection surfaces described thus far. Rather, as non-limiting examples, suitable optical elements can include various reflective elements, transmissive elements, refractive elements, diffractive elements, holographic elements, lenses, filters, diffusers, etc. One or more lenses may be disposed at or near the aperture of the camera, the image sensor of the camera, on one or both of the light-redirection surfaces, or other suitable positions within the camera to focus or otherwise redirect the light. Either or both of the light-redirection surfaces may include Fresnel elements. Suitable filters may be used to, for example, filter certain wavelengths of light, filter different polarizations of light, filter light based on spatial frequency (e.g., high-frequency patterns may be filtered out), filter out curved/straight elements, etc. It will be understood that the exact optical elements included with any particular camera can vary wildly depending on the intended application for the camera, and such optical elements can include virtually any suitable current or future optical technologies.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
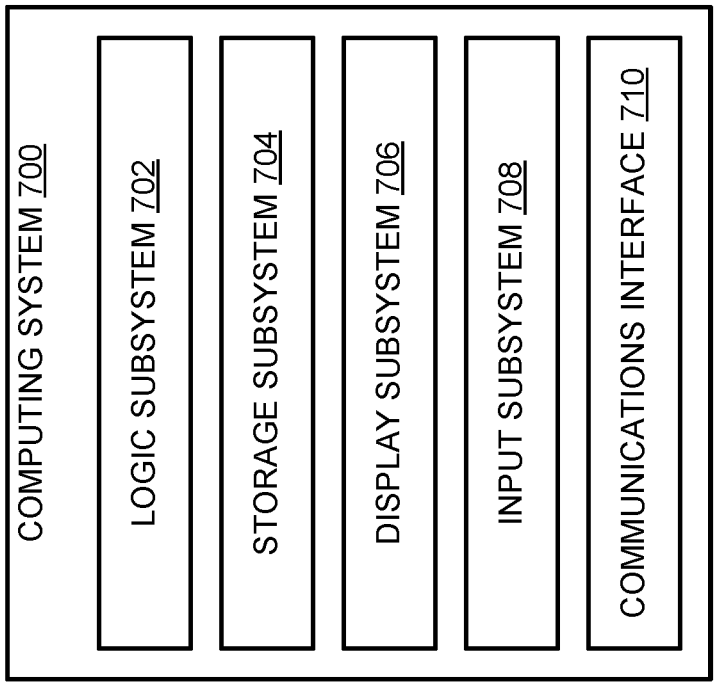
FIG. 7 schematically shows an example computing system.
Figure 6:
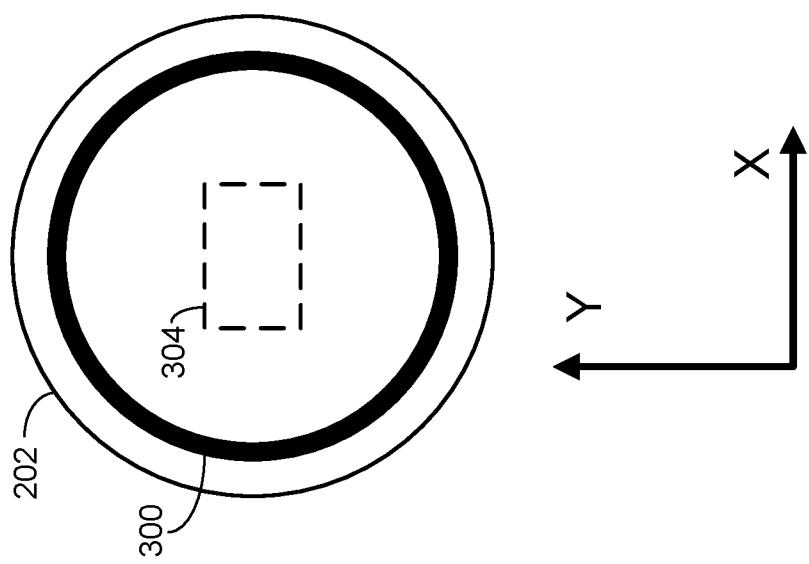
FIG. 6 schematically depicts another example camera for use with an augmented reality display device.

FIG. 7 schematically shows a simplified representation of a computing system 700 configured to provide any to all of the compute functionality described herein. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, an augmented reality display device comprises: a near-eye display configured to present imagery to a user eye; and a camera configured to capture light from a real-world environment and produce output useable to contribute to the imagery presented to the user eye via the near-eye display, the camera comprising: an aperture configured to receive the light from the real-world environment; an image sensor configured to respond to the light received from the real-world environment by generating sensor output signals useable to produce images on the near-eye display depicting the real-world environment; and one or more optical elements providing an optical path for light from the aperture to the image sensor, the optical path having a length that is within a threshold of a distance between the user eye and the aperture of the camera. In this example or any other example, the one or more optical elements include two light-redirection surfaces configured to provide the optical path by repeatedly reflecting light between the two light-redirection surfaces. In this example or any other example, the image sensor is disposed on an aperture-proximal light-redirection surface of the two light-redirection surfaces. In this example or any other example, light is reflected by an aperture-distal light-redirection surface of the two light-redirection surfaces two or more times along the optical path from the aperture to the image sensor. In this example or any other example, the two light-redirection surfaces are independent components separated by an airgap. In this example or any other example, a distance between the two light-redirection surfaces is dynamically adjustable. In this example or any other example, the two light-redirection surfaces are first and second surfaces of a single optically transmissive substrate. In this example or any other example, the optically transmissive substrate is an electro-optic material having a dynamically-changeable refractive index. In this example or any other example, the two light-redirection surfaces are planar and parallel to one another. In this example or any other example, the two light-redirection surfaces are produced via wafer-scale fabrication. In this example or any other example, the two light-redirection surfaces are curved. In this example or any other example, the two light-redirection surfaces are produced via diamond turning. In this example or any other example, one or both of the two light-redirection surfaces include Fresnel elements. In this example or any other example, the aperture includes one or more annular rings formed in an environment-facing surface of the camera. In this example or any other example, the camera is positioned along an optical axis extending away from the user eye. In this example or any other example, the augmented reality display device further comprises a virtual image renderer configured to generate virtual images for display to the user eye via the near-eye display, where the virtual images are superimposed over the images depicting the real-world environment. In this example or any other example, the threshold is 50%. In this example or any other example, the threshold is 10% percent.

In an example, an augmented reality display device comprises: a near-eye display configured to present imagery to a user eye; a virtual image renderer configured to generate virtual images that contribute to the imagery presented to the user eye via the near-eye display; and a camera configured to capture light from a real-world environment and produce output useable to contribute to the imagery presented to the user eye via the near-eye display, the camera comprising: an aperture configured to receive the light from the real-world environment; an image sensor configured to respond to the light received from the real-world environment by generating sensor output signals useable to produce images on the near-eye display depicting the real-world environment; and two or more light-redirection surfaces configured to repeatedly reflect light between the two or more light-redirection surfaces, thereby providing an optical path for light from the aperture to the image sensor, the optical path having a length that is within a threshold of a distance between the user eye and the aperture of the camera.

In an example, a camera comprises: an aperture configured to receive light from a real-world environment, the aperture including an annular ring formed in an environment-facing surface of the camera; an image sensor configured to respond to the light received from the real-world environment by generating sensor output signals useable to produce images for display to a user eye; and two or more light-redirection surfaces configured to repeatedly reflect light between the two or more light-redirection surfaces, thereby providing an optical path for light from the aperture to the image sensor, the optical path having a length that is within a threshold of a distance between the user eye and the aperture of the camera.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. An augmented reality display device, comprising:
a near-eye display configured to present imagery to a user eye; and
a camera configured to capture light from a real-world environment and produce output useable to contribute to the imagery presented to the user eye via the near-eye display, the camera comprising:
an aperture configured to receive the light from the real-world environment;
an image sensor configured to respond to the light received from the real-world environment by generating sensor output signals useable to produce images on the near-eye display depicting the real-world environment; and
one or more optical elements providing an optical path for light from the aperture to the image sensor, the optical path having a length that is within a threshold of a distance between the user eye and the aperture of the camera.

2. The augmented reality display device of claim 1, where the one or more optical elements include two light-redirection surfaces configured to provide the optical path by repeatedly reflecting light between the two light-redirection surfaces.

3. The augmented reality display device of claim 2, where the image sensor is disposed on an aperture-proximal light-redirection surface of the two light-redirection surfaces.

4. The augmented reality display device of claim 2, where light is reflected by an aperture-distal light-redirection surface of the two light-redirection surfaces two or more times along the optical path from the aperture to the image sensor.

5. The augmented reality display device of claim 2, where the two light-redirection surfaces are independent components separated by an airgap.

6. The augmented reality display device of claim 5, where a distance between the two light-redirection surfaces is dynamically adjustable.

7. The augmented reality display device of claim 2, where the two light-redirection surfaces are first and second surfaces of a single optically transmissive substrate.

8. The augmented reality display device of claim 7, where the optically transmissive substrate is an electro-optic material having a dynamically-changeable refractive index.

9. The augmented reality display device of claim 2, where the two light-redirection surfaces are planar and parallel to one another.

10. The augmented reality display device of claim 9, where the two light-redirection surfaces are produced via wafer-scale fabrication.

11. The augmented reality display device of claim 2, where the two light-redirection surfaces are curved.

12. The augmented reality display device of claim 11, where the two light-redirection surfaces are produced via diamond turning.

13. The augmented reality display device of claim 2, where one or both of the two light-redirection surfaces include Fresnel elements.

14. The augmented reality display device of claim 1, where the aperture includes one or more annular rings formed in an environment-facing surface of the camera.

15. The augmented reality display device of claim 1, where the camera is positioned along an optical axis extending away from the user eye.

16. The augmented reality display device of claim 1, further comprising a virtual image renderer configured to generate virtual images for display to the user eye via the near-eye display, where the virtual images are superimposed over the images depicting the real-world environment.

17. The augmented reality display device of claim 1, where the threshold is 50%.

18. The augmented reality display device of claim 1, where the threshold is 10% percent.

\* \* \* \* \*